(12) United States Patent
Nasrallah et al.

(10) Patent No.: US 8,535,435 B2
(45) Date of Patent: Sep. 17, 2013

(54) METHOD OF FABRICATION OF CONSTRUCTION MATERIALS FROM INDUSTRIAL SOLID WASTE

(75) Inventors: Magdi M. Nasrallah, New Cairo (EG); Raouf O. Loutfy, Tucson, AZ (US)

(73) Assignee: Materials and Electrochemical Research (MER) Corporation, Tucson, AZ (US)

( * ) Notice: Subject to any disclaimer, the term of this patent is extended or adjusted under 35 U.S.C. 154(b) by 0 days.

(21) Appl. No.: 13/506,210

(22) Filed: Apr. 4, 2012

(65) Prior Publication Data

US 2012/0255463 A1    Oct. 11, 2012

Related U.S. Application Data

(60) Provisional application No. 61/516,756, filed on Apr. 7, 2011.

(51) Int. Cl.
    *C04B 18/04*    (2006.01)
(52) U.S. Cl.
    USPC ..................... 106/716; 106/718; 264/333
(58) Field of Classification Search
    USPC .................. 106/716, 718; 264/333
    See application file for complete search history.

(56) References Cited

U.S. PATENT DOCUMENTS

| | | | |
|---|---|---|---|
| 4,161,411 A | 7/1979 | Sell et al. | |
| 4,268,316 A * | 5/1981 | Wills, Jr. | 106/707 |
| 4,407,677 A * | 10/1983 | Wills, Jr. | 106/716 |
| 4,432,800 A | 2/1984 | Kneller et al. | |
| 5,366,548 A | 11/1994 | Riddle | |
| 5,391,226 A | 2/1995 | Frankowski | |
| 5,425,807 A | 6/1995 | Riddle | |
| 5,782,973 A | 7/1998 | Cohen et al. | |
| 6,331,207 B1 | 12/2001 | Gebhardt | |
| 6,695,909 B1 | 2/2004 | Zhu | |
| 7,077,203 B1 * | 7/2006 | Roddy et al. | 166/293 |
| 7,174,962 B1 * | 2/2007 | Roddy et al. | 166/293 |
| 7,335,252 B2 * | 2/2008 | Roddy et al. | 106/707 |
| 7,353,870 B2 | 4/2008 | Roddy et al. | |
| 7,381,263 B2 * | 6/2008 | Roddy et al. | 106/692 |
| 7,445,669 B2 * | 11/2008 | Roddy et al. | 106/707 |
| 7,478,675 B2 * | 1/2009 | Roddy et al. | 166/293 |
| 7,537,655 B2 * | 5/2009 | Abbate | 106/713 |
| 7,631,692 B2 * | 12/2009 | Roddy et al. | 166/250.14 |
| 7,674,332 B2 * | 3/2010 | Roddy et al. | 106/716 |
| 7,743,828 B2 * | 6/2010 | Roddy et al. | 166/277 |
| 7,789,150 B2 * | 9/2010 | Roddy et al. | 166/293 |
| 8,281,859 B2 * | 10/2012 | Roddy et al. | 166/291 |
| 8,297,357 B2 * | 10/2012 | Brenneis et al. | 166/293 |
| 8,307,899 B2 * | 11/2012 | Brenneis et al. | 166/293 |
| 8,327,939 B2 * | 12/2012 | Roddy et al. | 166/293 |
| 2007/0056474 A1 * | 3/2007 | Roddy et al. | 106/672 |
| 2007/0056732 A1 * | 3/2007 | Roddy et al. | 166/292 |
| 2007/0056733 A1 * | 3/2007 | Roddy et al. | 166/293 |
| 2007/0056734 A1 * | 3/2007 | Roddy et al. | 166/293 |
| 2007/0089643 A1 * | 4/2007 | Roddy et al. | 106/692 |
| 2007/0089880 A1 * | 4/2007 | Roddy et al. | 166/293 |
| 2008/0017077 A1 * | 1/2008 | Abbate | 106/679 |
| 2009/0114126 A1 * | 5/2009 | Roddy et al. | 106/692 |
| 2009/0320720 A1 * | 12/2009 | Roddy et al. | 106/692 |
| 2010/0258312 A1 * | 10/2010 | Brenneis et al. | 166/293 |
| 2011/0100626 A1 * | 5/2011 | Brenneis et al. | 166/293 |
| 2012/0291674 A1 * | 11/2012 | Brenneis et al. | 106/716 |
| 2012/0325119 A1 * | 12/2012 | Brenneis et al. | 106/698 |

* cited by examiner

*Primary Examiner* — Paul Marcantoni

(57) ABSTRACT

A low-pressure method for producing construction materials, such as blocks, bricks or slabs, utilizing high percentages of waste cement dust in admixture with additive material capable of effectively neutralizing the high lime content and agglomerating the extremely fine particles of the cement dust upon blending of the admixture with water. The resulting blend may simply be cast in molds of various shapes and sizes and cured under normal atmospheric pressure conditions into a hardened construction material exhibiting high strength, light weight and high thermal insulation.

20 Claims, No Drawings

METHOD OF FABRICATION OF CONSTRUCTION MATERIALS FROM INDUSTRIAL SOLID WASTE

This application claims the benefit of U.S. Provisional Application No. 61/516,756, filed Apr. 7, 2011, the entire contents of which are incorporated herein by reference.

FIELD OF THE INVENTION

This invention relates to the production of construction materials, such as blocks, bricks or slabs, and more particularly, to a low-pressure method for producing high-strength, light-weight, low-thermal conductivity construction materials from waste cement dust.

BACKGROUND OF THE INVENTION

Cement manufacturing is a critically important industry in the United States and throughout the world. In 2006, U.S. cement plants produced 99.8 million metric tons of Portland cement. Worldwide production accounted for about 2.5 billion metric tons. In the Portland cement manufacturing process, raw materials, which are generally comprised of limestone, sand, clay and iron ore, are fed proportionally into a grinding mill where they are crushed and ground to the desired fineness, and then fed into a rotary kiln system for calcining. The resulting calcined material, called "clinker", is allowed to cool and then passed into a grinding mill where it is interground with gypsum to produce the cement product.

A significant byproduct of the Portland cement manufacturing process, amounting to up to about 15 percent of the raw materials processed, is cement dust, which includes both the cement kiln dust (CKD) retained from cement kiln exhaust gas by air pollution control devices, and the cement bypass dust produced during the initial crushing and grinding of the raw materials. Cement dust is typically composed of varying concentrations of particles of raw materials, partly to wholly calcined raw materials, reaction process intermediates, fine clinker and inorganic fuel solids. Its high lime content and extremely fine particle size combine to render cement dust an extremely hazardous pollutant that has posed an ongoing serious solid waste management problem for the cement manufacturing industry.

The amount of cement dust that can suitably be recycled back into the cement manufacturing process as a feed without detrimentally affecting the efficiency of the process, is generally limited to not more than about 20 percent of the total amount generated. As for the unrecycled portion, only relatively minor amounts of cement dust have thus far been found useful for beneficial applications, such as soil consolidation, waste stabilization/solidification, cement additives, mine reclamation, agricultural soil amendment, liners and covers for sanitary landfills, wastewater neutralization and stabilization, pavement manufacturing, and concrete products. This leaves the major bulk of generated cement dust requiring disposal, typically in land-based disposal sites, such as landfills, waste piles or surface impoundments, which not only is costly and wasteful, but also renders these land sites completely useless for any other application such as agricultural or urban development.

Different approaches have been proposed by the prior art for addressing the cement dust problem. One such approach is to subject the cement dust to various treatment methods designed to render it more suitable for recycling back into the cement manufacturing process. The Sell et al. U.S. Pat. No. 4,161,441, the Cohen et al. U.S. Pat. No. 5,782,973, and the Gebhardt U.S. Pat. No. 6,331,207, are all illustrative of this approach. Sell et al. employ a high-pressure method for compacting the cement dust into mineral oil encapsulated briquettes. The Cohen et al. treatment method involves forming a mixture of the cement dust and a carbon-bearing material into nodules that are then thermally processed in a fluidized bed to reduce the alkali and sulfur content of the cement dust. Gebhardt treats the cement dust with carbon dioxide gas in an aqueous slurry, thereby allowing dissolved alkali and sulfate compounds to be removed from the cement dust solids. All of these treatment methods tend to be costly and complex solutions to the problem with significant energy expenditures.

Another prior art approach to the problem has been to attempt to incorporate the unrecycled cement dust as a component in various cement and concrete products. Cement dust utilization in preparing settable cement compositions is exemplified by the Wills, Jr. U.S. Pat. No. 4,268,316, and the Roddy et al. U.S. Pat. Nos. 7,353,870 and 7,445,669; and in forming construction blocks and other durable masses by the Wills, Jr. U.S. Pat. No. 4,407,677, the Kneller et al. U.S. Pat. No. 4,432,800, and the Riddle U.S. Pat. Nos. 5,366,548 and 5,425,807. In this latter regard, it should be noted that the construction blocks described by Wills, Jr. and the durable mass described by Kneller et al., both consist almost entirely of material other than cement dust and allow for the incorporation of the cement dust component in only very limited amounts, i.e., less than 7 weight percent in the case of Wills, Jr., and not more than 16 weight percent in the case of Kneller et al.

On the other hand, the cement dust-containing construction blocks disclosed by the two Riddle patents are formed from a dry composition containing from 100 to 15 weight percent cement dust with the remainder of the composition being an additive which may be cement, lime, gypsum plaster, polymers, resins, pumice, volcanic ash, sand clay or sand aggregate. The dry composition is blended with water, and the blended material is compressed in a compression zone at a pressure of 1000 to 2500 psi to form the construction block. Thus, while Riddle does teach the possibility of forming construction blocks incorporating a high percentage of cement dust and a low percentage of additive material, this teaching carries with it the proviso that high-pressure forming techniques must necessarily be employed in doing so. There is no hint whatsoever in either of the two Riddle patents of if or how high-percentage cement dust-containing construction blocks might otherwise be produced.

SUMMARY OF THE INVENTION

The present invention enables the production of high-strength, light-weight, low-thermal conductivity construction materials, such as blocks, bricks or slabs, utilizing cement dust in amounts of up to about 97 weight percent, and without the need of employing high-pressure forming techniques. The key to the low-pressure method of the present invention is in the proper selection of additive material to be used in initial admixture with the cement dust. Such additive material must have the capability to effectively neutralize the high lime content and agglomerate the extremely fine particles of the cement dust upon addition of water.

In carrying out the method of the present invention, a dry mix is first prepared, consisting essentially of from about 70 to about 97 weight percent of the cement dust and from about 3 to about 30 weight percent of additive material capable of effectively neutralizing the high lime content and agglomerating the extremely fine particles of the cement dust upon addition of water. The dry mix is then blended with a sufficient amount of water so as to transform the dry mix into a clay-like thixotropic blend. The blend is then formed into the desired size and shape of the construction material being produced, for example, by simply casting the blend in a mold or by extrusion, and the formed blend is thereafter cured under normal atmospheric pressure conditions into a hardened construction material.

The construction materials produced in accordance with the present invention have been found to exhibit superior load bearing capacity, superior thermal insulation and thermal shock resistance characteristics, and lower water absorption, along with light weight and excellent dimensional control, compared to currently produced conventional construction materials.

The method of the present invention is readily adaptable to be used in conjunction with the cement manufacturing process in a closed non-polluting system whereby the cement dust byproduct can be transferred from the cement kiln through closed air pipes as a direct feed into the construction material production line.

DESCRIPTION OF PREFERRED EMBODIMENTS

Waste cement dust disposal is a serious solid waste management problem for the cement manufacturing industry, similar to that of radioactive and chemically hazardous wastes, which require low processing costs, compatibility with a wide variety of disposal scenarios, and ability to meet stringent processing and storage requirements. The present invention provides an effective solution to that problem through a simple and economical method for utilizing large amounts of the waste cement dust in the production of industrially beneficial products.

The characteristics of cement dust that combine to make it an extremely hazardous pollutant are its high lime content and extremely fine particle size. A key feature of the present invention, enabling the production of high-percentage cement dust-containing construction materials without resorting to high-pressure forming techniques, is including in the production process the ability to effectively neutralize the high lime content and agglomerate the extremely fine particles of the cement dust. This is accomplished in accordance with the present invention through the proper selection of additive material to be used in initial admixture with the cement dust.

The essential ingredient of the additive material employed in the method of the present invention, comprising from about 10 to up to 100 weight percent of total additive material, is a highly reactive pozzolanic component possessing a specific surface area higher than that of the cement dust. A pozzolanic material, as defined by ASTM C-618, is a siliceous or siliceous and aluminous material which, in itself, possesses little or no cementitious value but which will, in finely divided form in the presence of moisture, react chemically with calcium hydroxide at ordinary temperature to form compounds possessing cementitious properties. Examples of highly reactive pozzolanic materials possessing a specific surface area higher than that of the cement dust, include silica fume and high-reactivity metakaolin.

Silica fume, also known as microsilica, is an extremely fine pozzolanic material, with a particle size approximately 100 times smaller than average cement particles, and composed mostly of amorphous silica. It is produced as a byproduct in the reduction of high-purity quartz with coke in electric arc furnaces in the production of silicon and ferrosilicon alloys. High-reactivity metakaolin is a highly processed finely divided aluminosilicate pozzolanic material, with a particle size nearly 10 times smaller than average cement particles. It is produced by calcining purified kaolinite clay, generally between 650-700° C., in an externally fired rotary kiln to drive off the chemically bound water in the interstices of kaolin and destroy the crystalline structure. Both silica fume and high-reactivity metakaolin are commonly employed in the concrete manufacturing industry as "supplementary cementitious materials" to partially replace the cement in Portland cement concrete and improve the concrete's properties, particularly its compressive strength, bond strength, abrasion resistance, chloride impermeability and freeze-thaw resistance. These two materials are both well known in the industry for their very high pozzolanic reactivities and very high specific surface areas, setting them apart from other conventionally used supplementary cementitious materials such as fly ash, volcanic ash, ground granulated blast furnace slag, rice husk ash and calcined shale.

The highly reactive pozzolanic component of the additive material employed in the method of the present invention, provides the additive material with the ability to effectively neutralize the high lime content and agglomerate the extremely fine particles of the cement dust. This is accomplished through the mechanism of a pozzolanic reaction between the pozzolanic component and the lime to convert the lime into calcium silicate hydrates. Such pozzolanic reaction, which takes place upon addition of water to an admixture of the cement dust with the additive material, is enabled to proceed aggressively by reason of the pozzolanic component having such a high pozzolanic reactivity and a specific surface area higher than that of the cement dust.

In addition to the highly reactive pozzolanic component, the additive material may optionally include, in amounts up to about 90 weight percent of total additive material, one or more supplemental components as processing aids and/or for improving the properties of the construction material being produced. One such supplemental component may be, for example, fly ash for increasing workability of the thixotropic blend while reducing water demand, and/or for increasing the construction material's final strength, chemical resistance and durability. Another supplemental component may be crumb rubber for providing the construction material with improved freeze-thaw and acid rain resistance, lighter weight, improved shock wave absorption and improved thermal insulation properties. Sodium silicate may be included as another of the supplemental components for aiding in the agglomeration of the cement dust particles. Various other supplemental components, such as light weight aggregates, lica particles, shredded rice husk, hay and grog, may be used alone or in combination for improving certain properties of the construction material, including thermal insulation, load bearing capacity and water absorption resistance.

In carrying out the method of the present invention, the first step is preparing a dry mix consisting essentially of from about 70 to about 97 weight percent of the cement dust and from about 3 to about 30 weight percent of the additive material. Based on the total weight of the dry mix, the additive material will include as an essential ingredient the highly reactive pozzolanic component in an amount of from about 3 to about 10 weight percent, and may optionally include as supplemental components fly ash in an amount of from 0 up to about 10 weight percent, crumb rubber in an amount of from 0 up to about 25 weight percent, sodium silicate in an amount of from 0 up to about 5 weight percent, and one or more of light weight aggregates, lica particles, shredded rice husk, hay or grog in a total amount of from 0 up to about 25 weight percent. Preferably, the dry mix consists essentially of from about 94 to about 97 weight percent of the cement dust and from about 3 to about 6 weight percent of the additive material of which at least half is the highly reactive pozzolanic component.

The dry mix is then blended with a sufficient amount of water so as to transform the dry mix into a clay-like thixotropic blend. Generally, the amount of water required will be within the range of from about 15 to about 40 weight percent of the blend, preferably from about 20 to about 30 weight percent. The blend is then formed into the desired size and shape of the construction material being produced. This is typically done simply by casting the blend in a suitable mold when the construction material being produced is in the shape of a block or brick. For producing slab-shaped products, extrusion techniques are more suitable.

The formed blend is thereafter cured under normal atmospheric pressure conditions into a hardened construction material. The curing step may be carried out at a temperature ranging from room temperature up to about 200° C. Curing temperatures above 200° C. have been found to cause a deterioration in compressive strength, attributed to a phase transition associated with a volume change and microcrack formation. As a practical matter, curing temperatures will not exceed 100° C. Typically, curing at a temperature of about 65° C. for about 16 hours will yield a high-strength product. While high-strength products can be obtained with room temperature curing, this requires extending the curing time beyond ten days.

Solid and hollow cement dust bricks and blocks of various shapes and sizes that have been produced in accordance with the present invention, have been found to exhibit a combination of properties that compare quite favorably with those of similar conventionally produced construction materials. These properties include superior load bearing capacity, reaching levels of about 200 Kg/cm$^2$; lower thermal conductivity, as low as about 0.3 W/m° C., indicating superior thermal insulation and thermal shock resistance characteristics; and lower water absorption, along with light weight and excellent dimensional control with insignificant dimensional changes detected before or after curing. In comparison with conventional fired clay bricks and cement bricks, for example, cement dust bricks produced in accordance with the present invention have been found, on average, to exhibit about 200 percent greater load bearing capacity, about 60 to 75 percent lower thermal conductivity, and, with respect to the fired clay bricks, about 25 percent lower water absorption.

The present invention thus provides an effective solution to the waste cement dust problem through a simple and economical low-pressure method for utilizing large amounts of the waste cement dust in the production of high-strength, light-weight, low-thermal conductivity construction materials. It does so without the need for complicated equipment, high-pressure forming or high-temperature firing, requiring only mixing, molding and air drying. The process is inexpensive, typically only a small fraction of the cost of materials and energy required to manufacture conventional fired clay bricks or cement bricks, and produces products which are ideal substitutes for these conventional construction materials in various applications such as building blocks, road blocks, pavement blocks and the like.

Another important aspect of the present invention is that the method is readily adaptable to be used in conjunction with the cement manufacturing process in a closed non-polluting system whereby the entire cement dust output can be transferred from the cement kiln through closed air pipes as a direct feed into the construction material production line. Such a closed system not only totally eliminates pollution caused by the hazardous cement dust, it also eliminates current expenses related to the transport and dumping of the cement dust.

The invention is further illustrated by way of the following examples.

Example 1

A dry mix is prepared consisting of 97 weight percent cement dust and 3 weight percent silica fume. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 2

A dry mix is prepared consisting of 90 weight percent cement dust, 4 weight percent silica fume and 6 weight percent fly ash. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 3

A dry mix is prepared consisting of 80 weight percent cement dust, 5 weight percent silica fume and 15 weight percent crumb rubber. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 4

A dry mix is prepared consisting of 94 weight percent cement dust, 3 weight percent silica fume and 3 weight percent sodium silicate. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 5

A dry mix is prepared consisting of 72 weight percent cement dust, 6 weight percent silica fume, 6 weight percent fly ash, 13 weight percent crumb rubber and 3 weight percent sodium silicate. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 6

A dry mix is prepared consisting of 70 weight percent cement dust, 6 weight percent silica fume, 8 weight percent light weight aggregates, 8 weight percent lica particles and 8 weight percent shredded rice husk. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

Example 7

A dry mix is prepared consisting of 80 weight percent cement dust, 4 weight percent silica fume, 8 weight percent shredded rice husk and 8 weight percent hay. The dry mix is then blended with water, in a dry mix to water weight ratio of 3:1, to transform the dry mix into a clay-like thixotropic blend. The blend is then extruded into the shape of a slab and left to air dry and cure for 3 to 5 days on a solid support under normal temperature and atmospheric pressure conditions and in the absence of direct sunlight, to produce a hardened construction slab.

Example 8

A dry mix is prepared consisting of 75 weight percent cement dust, 5 weight percent silica fume and 20 weight percent grog. The dry mix is then blended with water, in a dry mix to water weight ratio of 3:1, to transform the dry mix into a clay-like thixotropic blend. The blend is then cast in a block-shaped mold and cured in a drying oven at 65° C. under normal atmospheric pressure conditions for about 16 hours to produce a hardened construction block.

What is claimed is:

1. A method for producing block, brick or slab construction material from cement dust, comprising the steps of:
    (a) preparing a dry mix consisting essentially of from about 70 to about 97 weight percent cement dust and from about 3 to about 30 weight percent additive material comprising a pozzolanic component possessing a specific surface area higher than that of the cement dust so as to effectively neutralize the lime content and agglomerate the particles of said cement dust upon addition of water;
    (b) blending said dry mix with a sufficient amount of water so as to transform said dry mix into a thixotropic blend;
    (c) forming said blend into a block, brick or slab; and
    (d) curing the formed blend under atmospheric pressure conditions into a hardened construction material.

2. The method of claim 1, wherein said dry mix consists essentially of from about 94 to about 97 weight percent cement dust and from about 3 to about 6 weight percent of said additive material.

3. The method of claim 1, wherein said pozzolanic component constitutes from about 10 to up to 100 weight percent of total additive material.

4. The method of claim 3, wherein said pozzolanic component comprises silica fume.

5. The method of claim 3, wherein said pozzolanic component comprises high-reactivity metakaolin.

6. The method of claim 3, wherein said pozzolanic component constitutes from about 3 to about 10 weight percent of said dry mix.

7. The method of claim 6, wherein said additive material also includes one or more supplemental components selected from the group consisting of fly ash, crumb rubber, sodium silicate, light weight aggregates, shredded rice husk, hay and grog.

8. The method of claim 7, wherein said additive material includes fly ash in an amount of up to about 10 weight percent of said dry mix.

9. The method of claim 7, wherein said additive material includes crumb rubber in an amount of up to about 25 weight percent of said dry mix.

10. The method of claim 7, wherein said additive material includes sodium silicate in an amount of up to about 5 weight percent of said dry mix.

11. The method of claim 7, wherein said additive material includes one or more of light weight aggregates, shredded rice husk, hay or grog in a total amount of up to about 25 weight percent of said dry mix.

12. The method of claim 1, wherein the amount of water blended with said dry mix is within the range of from about 15 to about 40 weight percent of said blend.

13. The method of claim 12, wherein the amount of water blended with said dry mix is within the range of from about 20 to about 30 weight percent of said blend.

14. The method of claim 1, wherein the forming of said blend is carried out by casting said blend in a mold.

15. The method of claim 14, wherein said construction material is a block or brick.

16. The method of claim 1, wherein the forming of said blend is carried out by extrusion of said blend.

17. The method of claim 16, wherein said construction material is a slab.

18. The method of claim 1, wherein the curing step is carried out at a temperature ranging from room temperature up to about 200° C.

19. The method of claim 18, wherein the curing temperature does not exceed 100° C.

20. The method of claim 1, wherein said cement dust is obtained as a direct feed from a cement dust-generating cement kiln through a closed non-polluting piping system.

* * * * *